(12) United States Patent
Li et al.

(10) Patent No.: US 8,411,195 B2
(45) Date of Patent: Apr. 2, 2013

(54) FOCUS DIRECTION DETECTION CONFIDENCE SYSTEM AND METHOD

(75) Inventors: Pingshan Li, Sunnyvale, CA (US);
Kensuke Miyagi, Sunnyvale, CA (US);
Florian Ciurea, San Jose, CA (US);
Masato Watanabe, Saitama (JP);
Mamoru Sugiura, Kanagawa (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 13/078,397

(22) Filed: Apr. 1, 2011

(65) Prior Publication Data
US 2012/0249816 A1    Oct. 4, 2012

(51) Int. Cl.
*G03B 13/00* (2006.01)
*G06K 9/40* (2006.01)
(52) U.S. Cl. .................... 348/345; 382/254; 396/127
(58) Field of Classification Search .......... 348/345–352; 382/254–255; 396/127–129
See application file for complete search history.

(56) References Cited

U.S. PATENT DOCUMENTS

| 6,580,062 | B2 * | 6/2003 | Baer ................. 250/201.2 |
| 7,738,783 | B2 | 6/2010 | Kitamura |
| 7,936,987 | B2 * | 5/2011 | Park et al. ............. 396/104 |
| 2009/0074393 | A1 | 3/2009 | Park et al. |

OTHER PUBLICATIONS

Nikon Corporation—"Predictive Focus Tracking System" Mar. 2008, pp. 103, downloaded from the internet on Apr. 8, 2011 at http://www.nikon.com/about/technology/core/software/caf, 3 pages.

* cited by examiner

*Primary Examiner* — Aung S Moe
*Assistant Examiner* — Mekonnen Dagnew
(74) *Attorney, Agent, or Firm* — John P. O'Banion

(57) ABSTRACT

An apparatus and method for determining confidence in focus direction detection, including the steps of capturing a plurality of images, calculating sets of matching errors and blur difference estimations relating to the images, capturing a plurality of object images; calculating sets of matching errors and blur difference estimations relating to the images, calculating a confidence indicator as a function of either the matching errors or blur difference estimations, and automatically adjusting a focus control element in response to said confidence indicator exceeding a threshold value.

24 Claims, 4 Drawing Sheets

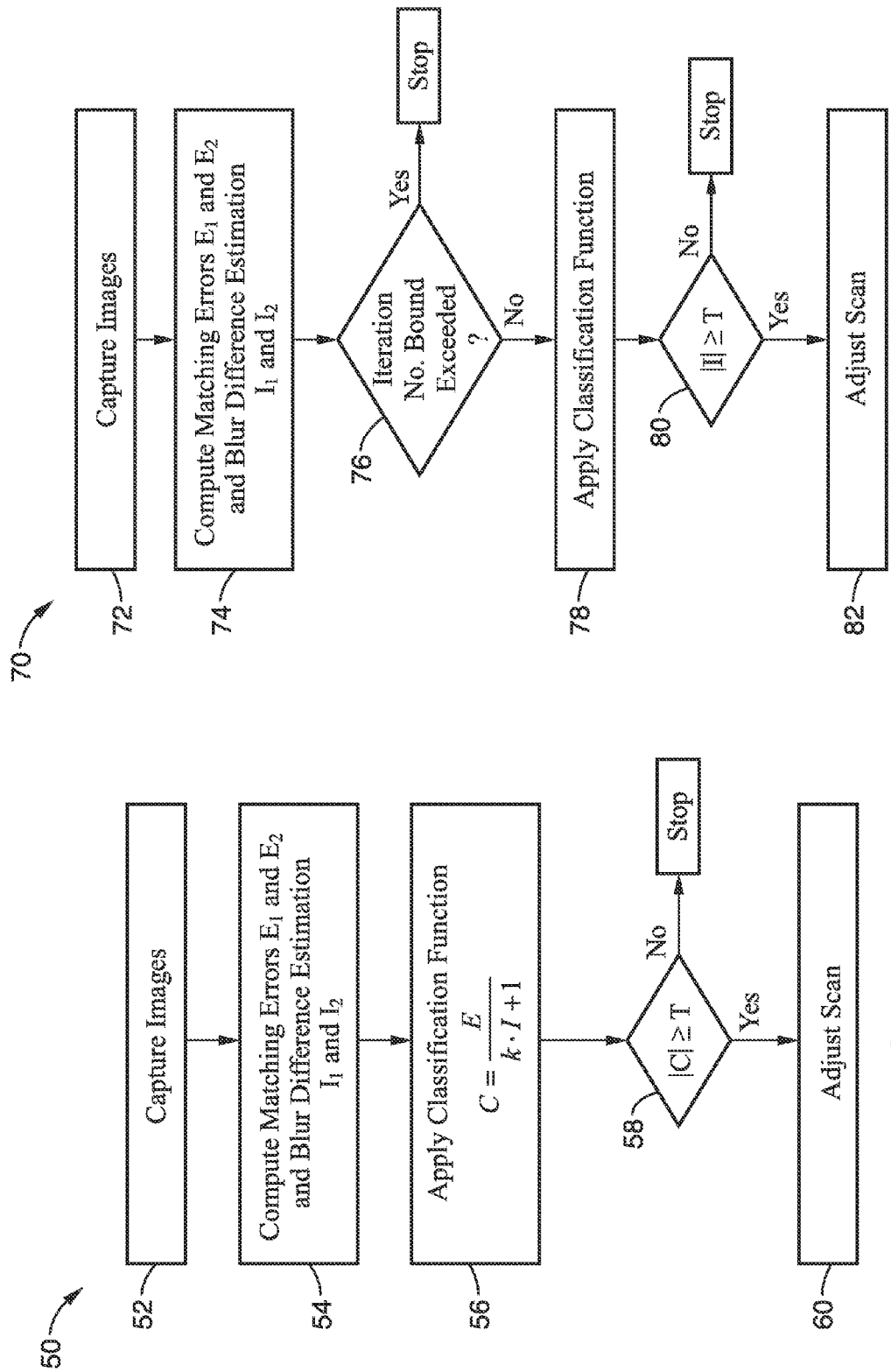

FOCUS DIRECTION DETECTION CONFIDENCE SYSTEM AND METHOD

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image capture, and more particularly to a method and apparatus for determining focus direction in a series of images.

2. Description of Related Art

One critical quality for capturing a desired image is that it be properly focused. Numerous systems have been developed for estimating or attaining a proper camera focus. As a camera-lens system has a number of related elements and characteristics, a brief discussion follows of these elements and their associated characteristics.

Generally, the two main optical parameters of a photographic lens are maximum aperture and focal length. The focal length determines the angle of view, and the size of the image relative to that of the object (subject) for a given distance to the subject (subject-distance). The maximum aperture (f-number, or f-stop) limits the brightness of the image and the fastest shutter speed usable for a given setting (focal length/effective aperture), with a smaller number indicating that more light is provided to the focal plane which typically can be thought of as the face of the image sensor in a simple digital camera.

One form of typical simple lens (technically a lens having a single element) is that of having a single focal length (also referred to as a "prime lens"). In focusing a camera using a single focal length lens, the distance between lens and the focal plane is changed therein altering the focal point of the photographic subject onto that focal plane. Thus, though the single focal length lens has a fixed optical relation and focal length, it is used in the camera to focus on subjects across a focal range span. Consequently, one should not confuse the fixed focal distance of a lens with the range of focal distance obtainable on a camera using that lens, whereby adjusting the position of that lens in relation to the focal plane alters focal distance.

In using a single focal length lens one would adjust aperture to select the amount of light with respect to desired shutter speed, and then adjust focus according to the subject-distance, which is also referred to as the focal distance and then capture an image. Often a macro setting is provided with a different focal length selection, on an otherwise single focal length lens, for taking close-up shots. A telephoto lens provides a very narrow angle of view with high magnification for filling the frame with images from distance objects.

Multi-focal length lenses are usually referred to as "zoom" lenses, because image magnification can be "zoomed", or "unzoomed" as the case may be. Zoom lenses allow the user to select the amount of magnification of the subject, or put another way, the degree to which the subject fills the frame. It is important to understand that the zoom function of these lenses, or camera-lens systems, is conceptually separate from both the focus control and the aperture control.

Regardless of whether a single-focal length lens or multi-focal length lens is utilized, it is important to properly focus the lens for a given subject-distance. An acceptable range of focus for a given focus setting is referred to as "depth of field" which is a measurement of depth of acceptable sharpness in the object space, or subject space. For example, with a subject distance of fifteen feet, an acceptable range of focus for a high definition camera may be on the order of inches, while optimum focus can require even more precision. It will be appreciated that depth of field increases as the focusing moves from intermediate distances out toward "infinity" (e.g., capturing images of distant mountains, clouds and so forth), which of course at that range has unlimited depth of field.

For a single focal length lens at a given aperture setting there will be a single optimum focus setting for a given distance from camera to the subject (subject-distance). Portions of the subject which are closer or farther than the focal distance of the camera will show up in the captured images subject to some measure of blurring, as depends on many factors that impact depth of field. However, in a multi-focal lens there is an optimum focus point for each lens magnification (lens focal length) obtainable by the lens. To increase practicality, lens makers have significantly reduced the need to refocus in response to zoom settings, however, the necessity for refocusing depends on the specific camera-lens system in use. In addition, the aperture setting can require changing in response to different levels of zoom magnification.

Originally, camera focus could only be determined and corrected in response to operator recognition and manual focus adjustments. However, due to the critical nature of focus on results, focusing aids were readily adopted. More recently, imaging devices often provide the ability to automatically focus on the subject, a function which is generically referred to today as "auto focus". Focus continues to be a point of intense technical development as each of the many existing auto focus mechanisms are subject to shortcomings and tradeoffs.

Two general types of auto focus (AF) systems exist, active auto focus and passive auto focus. In active auto focus, one or more image sensors is utilized to determine distance to the focal point, or otherwise detect focus external of the image capture lens system. Active AF systems can perform rapid focusing although they will not typically focus through windows, or in other specific applications, since sound waves and infrared light are reflected by the glass and other surfaces. In passive auto focus systems the characteristics of the viewed image are used to detect and set focus.

The majority of high-end SLR cameras currently use through-the-lens optical AF sensors, which for example, may also be utilized as light meters. The focusing ability of these modern AF systems can often be of higher precision than that achieved manually through an ordinary viewfinder.

One form of passive AF utilizes phase detection, such as by dividing the incoming light through a beam splitter into pairs of images and comparing them on an AF sensor. Two optical prisms capture the light rays coming from the opposite sides of the lens and divert it to the AF sensor, creating a simple rangefinder with a base identical to the diameter of the lens. Focus is determined in response to checking for similar light intensity patterns and phase difference calculated to determine if the object is considered in front of the focus or in back of the proper focus position.

In another type of passive AF system, contrast measurements are made within a sensor field through the lens. The system adjusts focus to maximize intensity difference between adjacent pixels which is generally indicative of correct image focus. Thus, focusing is performed until a maximum level of contrast is obtained. This form of focusing is slower than active AF, in particular when operating under dim light, but is a common method utilized in low end imaging devices.

Passive systems are notoriously poor at making focal decisions in low contrast conditions, notably on large single-colored surfaces (solid surface, sky, and so forth) or in low-light conditions. Passive systems are dependent on a certain degree of illumination to the subject (whether natural or otherwise), while active systems may focus correctly even in total darkness when necessary.

Recently, improved auto focusing techniques provide subject-distance estimations and/or focus control under a wide range of conditions by using depth estimation techniques.

The depth from defocus approach relies on estimating depth from two or more pictures taken at different camera settings generating different corresponding amount of defocus blur. Depth can be estimated by computing the relative blur amount between the pictures, as shown in U.S. Pat. No. 7,711,201 which is incorporated herein by reference in its entirety; and U.S. Patent Application Publication Nos. 2007/0189750A1, 2010/0080482A1, and 2010/0194971A1, each of which is incorporated herein by reference in its entirety.

In the two pictures case, relative blur may be computed by matching one of the pictures to increasingly blurred versions of the other picture until an optimal match is achieved. Since it is not known which of the two pictures is closer to the in-focus position, both directions are generally computed and then a best match criterion is used to choose direction.

The performance of the two-picture matching for depth for defocus generally depends on how well the significant features in the two pictures are properly aligned. If the two pictures are not properly aligned or significant mismatch exists, two-picture matching for depth for defocus may give incorrect estimation and direction of focus.

Thus, there is a need to estimate the confidence for direction of depth estimation based on two pictures to allow for determination of the direction of in-focus position as computed by depth from defocus two-picture matching.

The present invention fulfills that need as well as others and overcomes shortcomings of previous camera focus techniques.

BRIEF SUMMARY OF THE INVENTION

The present invention provides a classifier configured to separate right and wrong directions based on data from a depth or blur difference estimation of a two image focusing module. In a preferred embodiment, the classifier is based on using a dimension reduction method to determine the confidence in a focus direction.

One aspect of the invention is a method for focus direction detection, including the steps of capturing a plurality of images, calculating sets of matching errors and blur difference estimations relating to the images, capturing a plurality of object images; calculating sets of matching errors and blur difference estimations relating to the images, calculating a confidence indicator as a function of either the matching errors or blur difference estimations, and automatically adjusting a focus control element in response to said confidence indicator exceeding a threshold value.

Another aspect is an apparatus for electronically capturing images, The apparatus includes an imaging device, a focus control element coupled to the imaging device, a processor coupled to the imaging device and the focus control element, memory coupled to the computer processor and configured for retaining images captured from the imaging device and for retaining programming executable by the computer processor, and programming executable by the computer processor for carrying out steps comprising: capturing a plurality of object images; calculating sets of matching errors and blur difference estimations relating to the images; calculating a confidence indicator as a function of either the matching errors or blur difference estimations; and automatically adjusting the focus control element in response to said confidence indicator exceeding a threshold value.

In one embodiment, the confidence indicator is calculated according to the equation:

$$E = \frac{E_1 - E_2}{k_E \cdot (E_1 + E_2) + 1}$$

where E is the confidence indicator, $E_1$ and $E_2$ are estimations of error for first and second directions, and $k_E$ is a non-negative constant Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 3 is flow diagram of a method for processing a series of images by combined matching error and blur difference estimation-based classification in accordance with the present invention.

FIG. 4 is flow diagram of illustrating an alternative method for processing a series of images by utilizing an iteration number bound in accordance with the present invention.

DETAILED DESCRIPTION OF THE INVENTION

Referring more specifically to the drawings, for illustrative purposes the present invention is embodied in the apparatus generally shown in FIG. 1 through FIG. 6. It will be appreciated that the apparatus may vary as to configuration and as to details of the parts, and that the method may vary as to the specific steps and sequence, without departing from the basic concepts as disclosed herein.

Figures 1, 2:
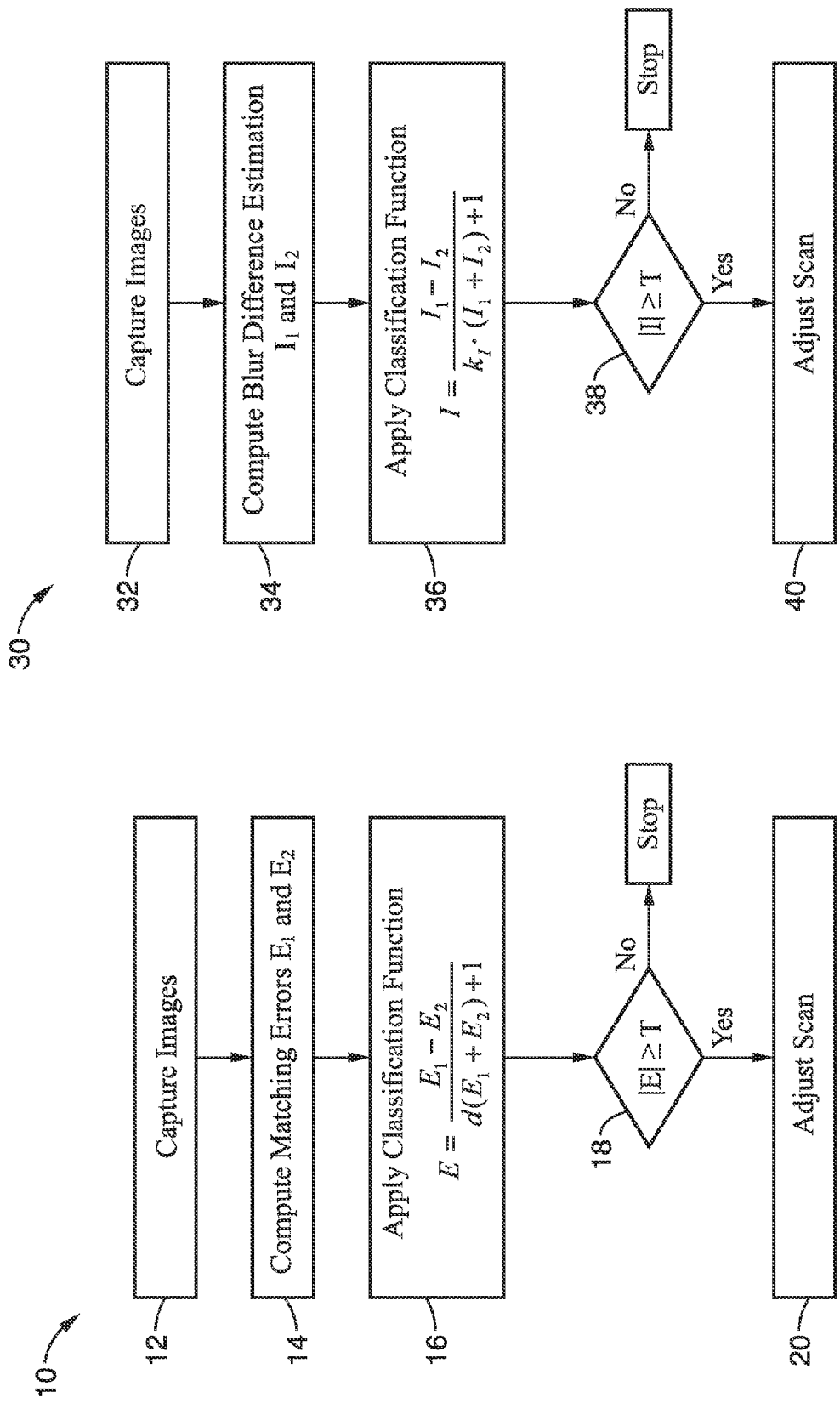
FIG. 1 is flow diagram of a method for processing a series of images by matching error-based classification in accordance with the present invention.
FIG. 2 is flow diagram of a method for processing a series of images by blur difference estimation-based classification in accordance with the present invention.

FIG. 1 illustrates a flow diagram of a preferred embodiment of the present invention using a method 10 for processing a series of images by matching error-based classification.

Figure 6:
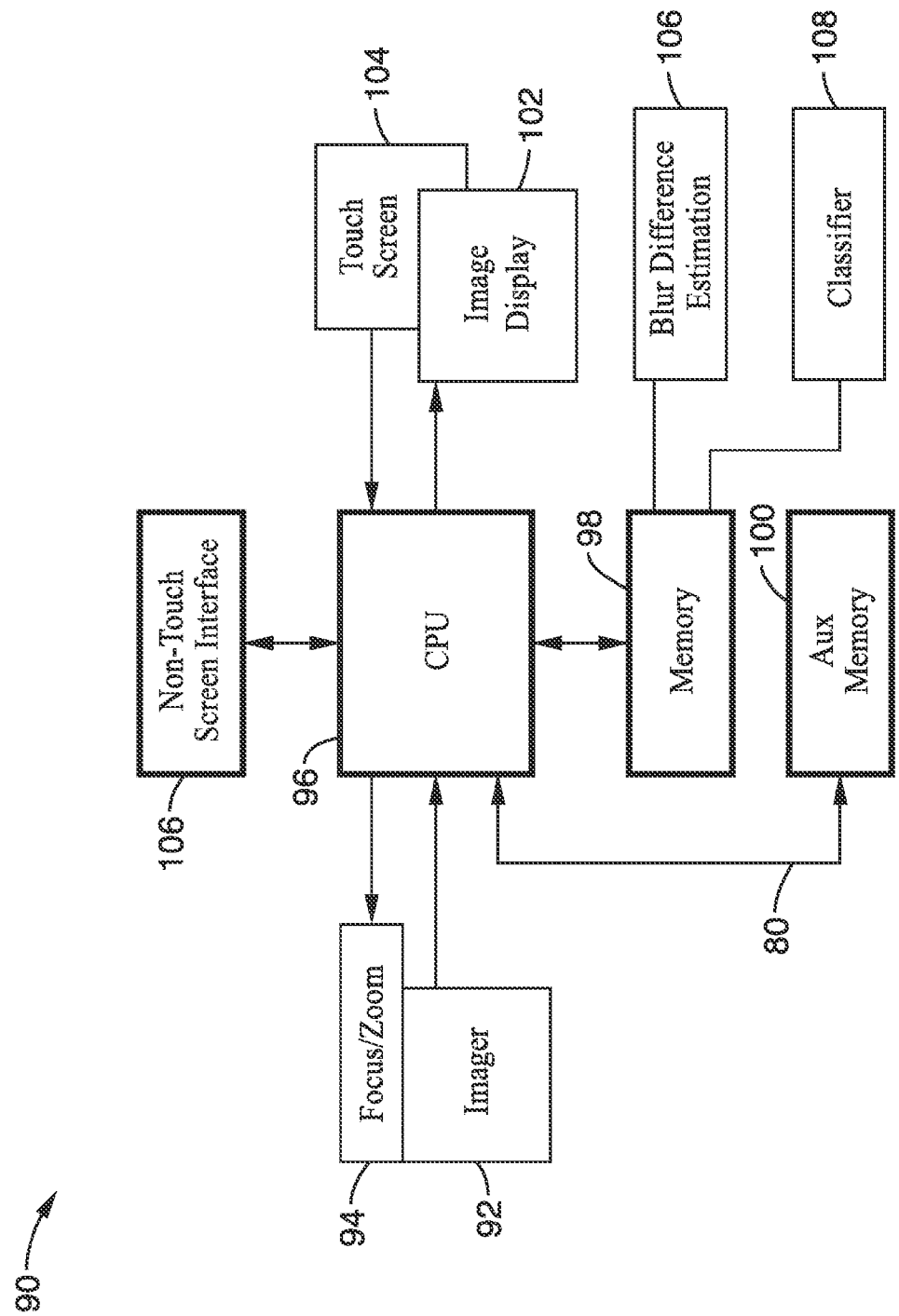
FIG. 6 is a block diagram of an image capture apparatus configured for performing blur difference estimation and calculating a confidence classifier for focus direction detection according to an aspect of the present invention.

At block 12, a pair of images are captured, e.g. via an image capture device 90 as shown in FIG. 6 and described below. The two images may be acquired from varying focal positions, beam splitting, or other methods known in the art.

Next, at block 14, matching errors $E_1$ and $E_2$ are computed. $E_1$ and $E_2$ are estimations of error for each (right and wrong) direction. Generally, matching errors $E_1$ and $E_2$ are computed in connection with computation blur difference estimation. In some implementations, depth estimation or blur difference estimation is achieved from of depth from defocus based on two pictures (e.g. U.S. Pat. No. 7,711,201; and U.S. Patent Application Publication Nos. 2007/0189750A1, 2010/0080482A1, and 2010/0194971A1; all of which are incorporated herein by reference in their entireties) and matching errors $E_1$ and $E_2$ are generated for the two directions corresponding to blur difference estimation. A direction is chosen to be corresponding to either $E_1$ or $E_2$.

At block 16, the matching errors $E_1$ and $E_2$ are then used to compute a direction indicator E that estimates the confidence of the direction computation of correct in-focus position. This indicator E has high precision when a correct direction is detected. A high value of the indicator E indicates that the direction computed by the two picture depth from defocus matching algorithm gives reliable results.

As illustrated in the method 10 shown in FIG. 1, indicator E is ideally based on the matching errors $E_1$ and $E_2$ in the classification function of Eq. 1:

$$E = \frac{E_1 - E_2}{k_E \cdot (E_1 + E_2) + 1} \quad \text{Eq. 1}$$

where $k_E$ is a non-negative constant that separates/dilates the distributions (see FIG. 5A) to obtain optimal value for class separation. Since the mean values for both right and wrong direction data are 0, $k_E$ is chosen so that the difference (ratio) between the standard deviations of the wrong data sets is maximized. The constant $k_E$ may be obtained empirically from calibration, and may comprise data across multiple settings for an imaging device 90.

In an exemplary data set, the optimal value for the constant $k_E$ was 1.0, with the ratio of standard deviations of the two data sets (right and wrong) at 6.27.

Figure 5B:
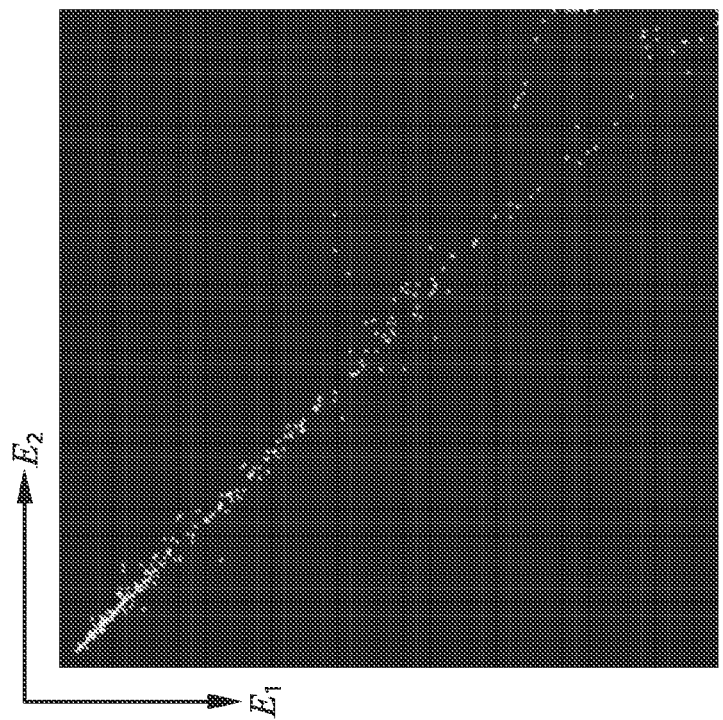
FIG. 5B illustrates a data distribution with respect to final matching errors in the wrong direction.
Figure 5A:
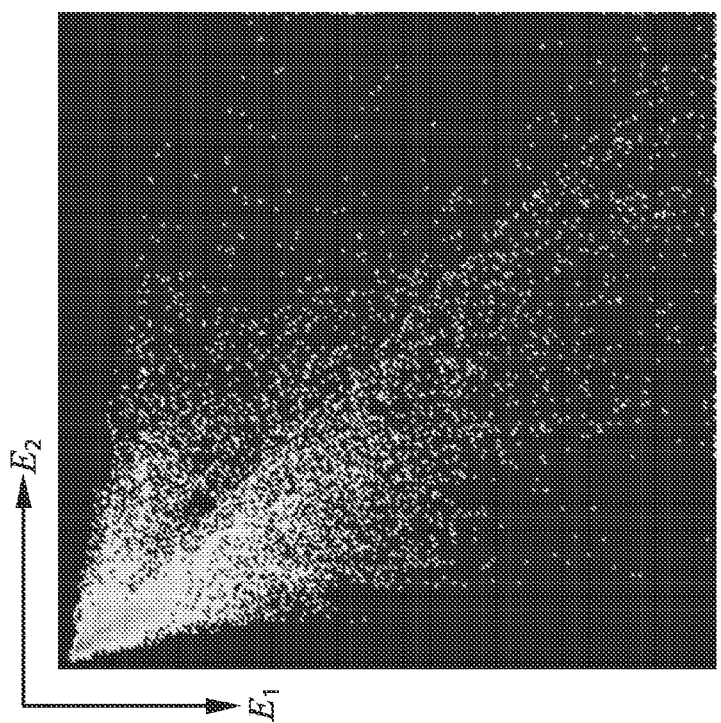
FIG. 5A illustrates a data distribution with respect to final matching errors in the right direction.

FIGS. 5A and 5B illustrate data distribution of the correct direction (FIG. 5A) and incorrect direction (FIG. 5B) based on evaluation against manually annotated data on a large dataset of tens of thousands of picture pairs. It can be observed that the "incorrect direction" data shown in FIG. 5B is clustered along the direction of $E_1=E_2$, where $E_1$, $E_2$ are matching errors for the two directions respectively.

Based on this data distribution, the indicator E of equation 1 can separate the correct direction, which are spread away from the $E_1=E_2$ line (FIG. 5A) from the incorrect direction which is mostly clustered around the $E_1=E_2$ line (FIG. 5B).

At block 18, the absolute value of the indicator |E| is then compared against a threshold value T. If the absolute value of indicator |E| exceeds the pre-defined threshold T, the computed direction is considered confident that the direction is the right direction; otherwise, the computed direction is considered not confident in the right direction.

At block 20, the confidence indicator E is then used to know when to trust the result of estimated in-focus direction and can be used in subsequent processing (e.g. scanning of focus range) to enhance the performance of the auto focusing system which relies on accurate in-focus direction. For example, if a threshold confidence is achieved, the system may perform a scan of the in the selected direction, as opposed to scanning (hunting) the entire range of lens position.

In one example, a Sony HX1 camera was used to collect data to test the indicator E. Eleven (11) sequences were taken at telephoto and wide open setting 158 sequences were taken at other zoom positions and aperture settings. The scenes were captured at different distances, textures and lighting conditions. A total of 20503 matching results were obtained, of which 698 were the wrong directions (3.4%). If the iteration number is 0 and the lens position is farther than 4 DOF to the focus position, it is also considered to be the wrong direction.

Table 1 shows an evaluation of classification performance, with values illustrating example relationship between precision, recall and threshold T.

The performance classifier was evaluated using the following parameters:

Right direction precision=number of detected right direction/number of detected matching results. Detected matching results mean results with an indicator value above the threshold T.

Right direction recall=number of detected right direction/number of all right direction.

As can be seen in Table 1, the precision ranged from 99%-99.95% with recall varying from 43.3% to 92.7% across varying threshold values.

The threshold T can be adjusted depending on desired level of precision and recall desired from the indicator and depends on the application of the indicator. An indicator with high precision can be used in applications where failure rate of indicator is not tolerated and a high level of precision is achieved at the expense of reduced recall rate and vice-versa.

While use of matching errors $E_1$ and $E_2$ in the function of Eq. 1 is a preferred method of calculating confidence, it is appreciated that other data acquired in the depth of defocus calculations may be used to as a classification factor.

FIG. 2 is flow diagram of a method 30 for processing a series of images by blur difference estimation-based classification in accordance with the present invention.

At block 32, a pair of images are captured, e.g. via an image capture device 90 via any of the techniques described above. At block 34, blur difference estimates, or iteration numbers $I_1$ and $I_2$ are calculated via any available depth from defocus techniques available in the art.

As illustrated in the method 30 shown in FIG. 1, confidence indicator I is calculated at block 36 based on the iteration numbers $I_1$ and $I_2$ in the classification function of Eq. 2:

$$I = \frac{I_1 - I_2}{k_I \cdot (I_1 + I_2) + 1} \qquad \text{Eq. 2}$$

where $k_I$ is a non-negative constant that separates/dilates the distributions) to obtain optimal value for class separation.

At block 38, the absolute value of the indicator |I| is then compared against a threshold value T. If the absolute value of indicator |I| exceeds the pre-defined threshold T, the computed direction is considered confident that the direction is the right direction; otherwise, the computed direction is considered not confident in the right direction.

At block 40, the confidence indicator I is then used in subsequent processing (e.g. scanning of focus range) to enhance the performance of the auto focusing system which relies on accurate in-focus direction.

FIG. 3 shows a flow diagram of a method 50 for processing a series of images by combined matching error and blur difference estimation-based classification in accordance with the present invention.

At block 52, a pair of images are captured, e.g. via an image capture device 90 via any of the techniques described above. At block 54, blur difference estimates, or iteration numbers $I_1$ and $I_2$ are calculated via any available depth from defocus techniques available in the art.

As illustrated in the method 50 shown in FIG. 3, confidence indicator C is calculated at block 56 based on the a combination of iteration numbers $I_1$ and $I_2$ and matching errors $E_1$ and $E_2$ in the classification function of Eq. 3:

$$C = \frac{E}{k \cdot I + 1} \qquad \text{Eq. 3}$$

where E and I are computed from Eq. 1 and Eq. 2 respectively, k is a non-negative constant that separates/dilates the distributions) to obtain optimal value for class separation.

At block 58, the absolute value of the indicator |C| is then compared against a threshold value T. If the absolute value of indicator |C| exceeds the pre-defined threshold T, the computed direction is considered confident that the direction is the right direction; otherwise, the computed direction is considered not confident in the right direction.

At block 60, the confidence indicator C is then used in subsequent processing (e.g. scanning of focus range) to enhance the performance of the auto-focusing system which relies on accurate in-focus direction.

FIG. 4 shows a flow diagram of illustrating an alternative method 70 for processing a series of images by utilizing an iteration number bound in accordance with the present invention.

At block 72, a pair of images are captured, e.g. via an image capture device 90 via any of the techniques described above. At block 74, depth estimates, and/or iteration numbers $I_1$ and $I_2$ are calculated via any available depth from defocus techniques available in the art.

At block 76, an evaluation of whether the iteration bound number is exceeded is performed. At each lens position, there is a lower and upper bound of the iteration number. The bounds may be computed empirically by the calibration curves for infinity and for the closest focus distance. A margin (e.g. iteration number 3) may be added to the bounds. If the iteration number exceeds the bounds, it is classified as an outlier and the direction is classified as a not confident. Because the data is considered unreliable, the classification equation at step 78 is not applied. At this point, the program may direct the device to capture of new images at step 72 and subsequent computation at step 74.

If the iteration number bound is not exceeded, confidence indicator (E, I or C) is calculated at block 78 based on the desired classification functions in Eq. 1, 2 or 3.

At block 80, the absolute value of the indicator |E|, |I| or |C| is then compared against a threshold value T. If the absolute value of indicator |E|, |I| or |C| exceeds the pre-defined threshold T, the computed direction is considered confident that the direction is the right direction; otherwise, the computed direction is considered not confident in the right direction.

At block 82, the confidence indicator is then used in subsequent processing (e.g. scanning of focus range) to enhance the performance of the auto-focusing system which relies on accurate in-focus direction.

FIG. 6 is a block diagram of an image capture apparatus 90 configured for performing blur difference estimation and calculating a confidence classifier for focus direction detection according to an aspect of the present invention. Image capture device (e.g. camera) 90 comprises focus/zoom control 94 shown coupled to imaging optics 92 as controlled by a computer (CPU) 96. Computer 96 performs blur difference estimation and confidence classification in response to instructions contained in blur difference estimation module 106 and classifier module 108 that are executed from memory 98 and/or auxiliary memory 100. Classifier module may be configured to perform the classification operations of one or more of the methods 10, 30, 50 and 70 shown in FIGS. 1 through 4.

Imager 92 may comprise one or more charge-coupled device (CCD), complementary metal-oxide semiconductor (CMOS) imaging element, or the like.

Shown by way of example for a camera device (e.g., video or still) are an image display 102 and touch screen 104, however, it will be appreciated that the method according to the present invention can be implemented on various image capture devices which are configured with focus control, focus indicators, or combinations thereof. It should be appreciated that calibration process may be performed by a computer controlled test setup.

It will be appreciated that in addition to auto focusing, and focus direction detection taught herein has many applications in areas including computer/robotic vision, surveillance, 3D imaging, and similar imaging systems.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

From the discussion above it will be appreciated that the invention can be embodied in various ways, including the following:

1. An apparatus for electronically capturing images, comprising: an imaging device; a focus control element coupled to the imaging device; a processor coupled to the imaging device and the focus control element; memory coupled to the computer processor and configured for retaining images captured from the imaging device and for retaining programming executable by the computer processor; programming executable by the computer processor for carrying out steps comprising: capturing a plurality of object images; calculating sets of matching errors and blur difference estimations relating to the images; calculating a confidence indicator as a function of either the matching errors or blur difference estimations; and automatically adjusting the focus control element in response to said confidence indicator exceeding a threshold value.

2. The apparatus recited in embodiment 1, wherein the confidence indicator is a function of only matching errors.

3. The apparatus recited in embodiment 1, wherein the confidence indicator is calculated according to the equation:

$$E = \frac{E_1 - E_2}{k_E \cdot (E_1 + E_2) + 1}$$

where E is the confidence indicator, $E_1$ and $E_2$ are estimations of error for first and second directions, and $k_E$ is a non-negative constant.

4. The apparatus recited in embodiment 3, wherein $k_E$ is chosen so that the ratio between standard deviations of wrong data sets associated with the captured images is maximized.

5. The apparatus recited in embodiment 1, wherein the confidence indicator is calculated according to the equation:

$$I = \frac{I_1 - I_2}{k_I \cdot (I_1 + I_2) + 1}$$

where I is the confidence indicator, $I_1$ and $I_2$ are blur difference estimation iteration numbers for first and second directions, and $k_I$ is a non-negative constant.

6. The apparatus recited in embodiment 3, wherein the confidence indicator is further calculated according to the equation:

$$C = \frac{E}{k \cdot I + 1}$$

where C is the combined confidence indicator, $$I = \frac{I_1 - I_2}{k_I \cdot (I_1 + I_2) + 1},$$

$I_1$ and $I_2$ are blur difference estimation iteration numbers for first and second directions, and $k_I$ is a non-negative constant.

7. The apparatus recited in embodiment 1, wherein automatically adjusting the focus control element comprises scanning in one direction associated with the calculated confidence indicator.

8. The apparatus recited in embodiment 1: wherein the calculated sets of matching errors and blur difference estimations relating to the images are evaluated against an iteration number bound; and wherein the confidence indicator is only calculated if the iteration number bound is not exceeded.

9. The apparatus recited in embodiment 1, wherein the imaging device comprises a still image camera, a video image camera, or a combination still and video image camera.

10. A method electronically capturing images, comprising: capturing a plurality of object images; calculating sets of matching errors and blur difference estimations relating to the capturing a plurality of object images; calculating sets of matching errors and blur difference estimations relating to the images; calculating a confidence indicator as a function of either the matching errors or blur difference estimations; and automatically adjusting a focus control element in response to said confidence indicator exceeding a threshold value.

11. A method as recited in embodiment 10, wherein the confidence indicator is calculated according to the equation:

$$E = \frac{E_1 - E_2}{k_E \cdot (E_1 + E_2) + 1}$$

where E is the confidence indicator, $E_1$ and $E_2$ are estimations of error for first and second directions, and $k_E$ is a non-negative constant.

12. A method as recited in embodiment 11, wherein $k_E$ is chosen so that the ratio between standard deviations of wrong data sets associated with the captured images is maximized.

13. A method as recited in embodiment 11, wherein the confidence indicator is further calculated according to the equation:

$$I = \frac{I_1 - I_2}{k_I \cdot (I_1 + I_2) + 1}$$

where I is the confidence indicator, $I_1$ and $I_2$ are blur difference estimation iteration numbers for first and second directions, and $k_I$ is a non-negative constant.

14. A method as recited in embodiment 11, wherein the confidence indicator is further calculated according to the equation:

$$C = \frac{E}{k \cdot I + 1}$$

where C is the combined confidence indicator, $$I = \frac{I_1 - I_2}{k_I \cdot (I_1 + I_2) + 1},$$

$I_1$ and $I_2$ are blur difference estimation iteration numbers for first and second directions, and $k_I$ is a non-negative constant.

15. A method as recited in embodiment 10, wherein automatically adjusting the focus control element comprises scanning in one direction associated with the calculated confidence indicator.

16. A method as recited in embodiment 10: wherein the calculated sets of matching errors and blur difference estimations relating to the images are evaluated against an iteration number bound; and wherein the confidence indicator is only calculated if the iteration number bound is not exceed.

17. A computer-readable media containing a computer program executable on a processer which is configured for automatically estimating camera focal depth of an object in response to steps comprising: capturing a plurality of object images; calculating sets of matching errors and blur difference estimations relating to the images; calculating a confidence indicator as a function of either the matching errors or blur difference estimations; and automatically adjusting a focus control element in response to said confidence indicator exceeding a threshold value; wherein the confidence indicator is calculated according to the equation:

$$E = \frac{E_1 - E_2}{k_E \cdot (E_1 + E_2) + 1}$$

where E is the confidence indicator, $E_1$ and $E_2$ are estimations of error for first and second directions, and $k_E$ is a non-negative constant.

18. A computer-readable media as recited in embodiment 17, wherein $k_E$ is chosen so that the ratio between standard deviations of wrong data sets associated with the captured images is maximized.

19. A computer-readable media as recited in embodiment 18, wherein the confidence indicator is further calculated according to the equation:

$$I = \frac{I_1 - I_2}{k_I \cdot (I_1 + I_2) + 1}$$

where I is the confidence indicator, $I_1$ and $I_2$ are blur difference estimation iteration numbers for first and second directions, and $k_I$ is a non-negative constant.

20. A computer-readable media as recited in embodiment 17, wherein the confidence indicator is further calculated according to the equation:

$$C = \frac{E}{k \cdot I + 1}$$

where C is the combined confidence indicator, $$I = \frac{I_1 - I_2}{k_I \cdot (I_1 + I_2) + 1},$$

$I_1$ and $I_2$ are blur difference estimation iteration numbers for first and second directions, and $k_I$ is a non-negative constant.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

| | Threshold | | | |
| --- | --- | --- | --- | --- |
| | 0.001206 | 0.03408 | 0.09486 | 0.1924 |
| Precision | 99% | 99.5% | 99.9% | 99.95% |
| Recall | 92.7% | 89.3% | 75.4% | 43.3% |

What is claimed is:

1. An apparatus for electronically capturing images, comprising:
   (a) an imaging device;
   (b) a focus control element coupled to the imaging device;
   (c) a processor coupled to the imaging device and the focus control element;
   (d) memory coupled to the computer processor and configured for retaining images captured from the imaging device and for retaining programming executable by the computer processor; and
   (e) programming executable by the computer processor for carrying out steps comprising:
      capturing a plurality of object images;
      calculating sets of matching errors and blur difference estimations relating to the images;
      calculating a confidence indicator as a function of either the matching errors or blur difference estimations; and
      automatically adjusting the focus control element in response to said confidence indicator exceeding a threshold value;
      wherein the confidence indicator is calculated according to the equation:

$$E = \frac{E_1 - E_2}{k_E \cdot (E_1 + E_2) + 1}$$

where E is the confidence indicator, $E_1$ and $E_2$ are estimations of error for first and second directions, and $k_E$ is a non-negative constant.

2. An apparatus as recited in claim 1, wherein the confidence indicator is a function of only matching errors.

3. An apparatus as recited in claim 1, wherein $k_E$ is chosen so that the ratio between standard deviations of wrong data sets associated with the captured images is maximized.

4. An apparatus as recited in claim 1, wherein the confidence indicator is calculated according to the equation:

$$I = \frac{I_1 - I_2}{k_I \cdot (I_1 + I_2) + 1}$$

where I is the confidence indicator, $I_1$ and $I_2$ are blur difference estimation iteration numbers for first and second directions, and $k_I$ is a non-negative constant.

5. An apparatus as recited in claim 1, wherein the confidence indicator Is further calculated according to the equation:

$$C = \frac{E}{k \cdot I + 1}$$

where C is the combined confidence indicator, $$I = \frac{I_1 - I_2}{k_I \cdot (I_1 + I_2) + 1},$$

$I_1$ and $I_2$ are blur difference estimation iteration numbers for first and second directions, and $k_I$ is a non-negative constant.

6. An apparatus as recited in claim 1, wherein automatically adjusting the focus control element comprises scanning in one direction associated with the calculated confidence indicator.

7. An apparatus as recited in claim 1:
wherein the calculated sets of matching errors and blur difference estimations relating to the images are evaluated against an iteration number bound; and
wherein the confidence indicator is only calculated if the iteration number bound is not exceeded.

8. An apparatus as recited in claim 1, wherein the imaging device comprises a still image camera, a video image camera, or a combination still and video image camera.

9. A method for electronically capturing images, comprising:
(a) capturing a plurality of object images;
(b) calculating, within an electronic device, sets of matching errors and blur difference estimations relating to the images;
(c) calculating a confidence indicator, within the electronic device, as a function of either the matching errors or blur difference estimations; and
(d) automatically adjusting a focus control element in response to said confidence indicator exceeding a threshold value;
(e) wherein the confidence indicator is calculated according to the equation:

$$E = \frac{E_1 - E_2}{k_E \cdot (E_1 + E_2) + 1}$$

where E is the confidence indicator, $E_1$ and $E_2$ are estimations of error for first and second directions, and $k_E$ is a non-negative constant.

10. A method as recited in claim 9, wherein $k_E$ is chosen so that the ratio between standard deviations of wrong data sets associated with the captured images is maximized.

11. A method as recited in claim 10, wherein the confidence indicator is further calculated according to the equation:

$$I = \frac{I_1 - I_2}{k_I \cdot (I_1 + I_2) + 1}$$

where I is the confidence indicator, $I_1$ and $I_2$ are blur difference estimation iteration numbers for first and second directions, and $k_I$ is a non-negative constant.

12. A method as recited in claim 10, wherein the confidence indicator is further calculated according to the equation:

$$C = \frac{E}{k \cdot I + 1}$$

where C is the combined confidence indicator, $$I = \frac{I_1 - I_2}{k_I \cdot (I_1 + I_2) + 1},$$

and $I_2$ are blur difference estimation iteration numbers for first and second directions, and $k_I$ is a non-negative constant.

13. A method as recited in claim 9, wherein automatically adjusting the focus control element comprises scanning in one direction associated with the calculated confidence indicator.

14. A method as recited in claim 9:
wherein the calculated sets of matching errors and blur difference estimations relating to the images are evaluated against an iteration number bound; and
wherein the confidence indicator is only calculated if the iteration number bound is not exceeded.

15. A method recited in claim 9, wherein the confidence indicator is a function of only matching errors.

16. A method recited in claim 9, wherein the imaging device comprises a still image camera, a video image camera, or a combination still and video image camera.

17. A non-transitory computer-readable media containing a computer program executable on a processor which is configured for automatically estimating camera focal depth of an object in response to steps comprising:
(a) capturing a plurality of object images;
(b) calculating sets of matching errors and blur difference estimations relating to the images;
(c) calculating a confidence indicator as a function of either the matching errors or blur difference estimations; and
(d) automatically adjusting a focus control element in response to said confidence indicator exceeding a threshold value;
(e) wherein the confidence indicator is calculated according to the equation:

$$E = \frac{E_1 - E_2}{k_E \cdot (E_1 + E_2) + 1}$$

where E is the confidence indicator, $E_1$ and $E_2$ are estimations of error for first and second directions, and $k_E$ is a non-negative constant.

18. A non-transitory computer-readable media as recited in claim 17, wherein $k_E$ is chosen so that the ratio between standard deviations of wrong data sets associated with the captured images is maximized.

19. A non-transitory computer-readable media as recited in claim 18, wherein the confidence indicator is further calculated according to the equation:
   $I=((I_1)-(I_2))/(k_1((I_1)+(I_2))+1$ where I is the confidence indicator, I1 and I2 are blur difference estimation iteration numbers for first and second directions, and k~ is a non-negative constant.

20. A non-transitory computer-readable media as recited in claim 17, wherein the confidence indicator is further calculated according to the equation:

$C=E/k.I+I$ where C is the combined confidence indicator, $I=((I_1)-(I_2))/(k_1((I_1)+(I_2))+1$, I1 and I2 are blur $k_1.(I1+I2)+1$ difference estimation iteration numbers for first and second directions, and k~ is a non-negative constant.

21. A non-transitory computer-readable media recited in claim 17, wherein the confidence indicator is a function of only matching errors.

22. A non-transitory computer-readable media recited in claim 17, wherein automatically adjusting the focus control element comprises scanning in one direction associated with the calculated confidence indicator.

23. A non-transitory computer-readable media recited in claim 17:
   wherein the calculated sets of matching errors and blur difference estimations relating to the images are evaluated against an iteration number bound; and
   wherein the confidence indicator is only calculated if the iteration number bound is not exceeded.

24. A non-transitory computer-readable media recited in claim 17, wherein the imaging device comprises a still image camera, a video image camera, or a combination still and video image camera.

* * * * *